United States Patent

Kobayashi et al.

Patent Number: 5,197,356
Date of Patent: Mar. 30, 1993

[54] VEHICLE IGNITION LOCK AND TRANSMISSION SHIFT LOCK CONTROL MECHANISM

[75] Inventors: Satoshi Kobayashi; Takashi Maruta; Hiroshi Yamazaki, all of Kanagawa; Yasushi Asano, Shizuoka, all of Japan

[73] Assignees: Nissan Motor Co., Ltd.; Ohi Seisakusho Co., Ltd., both of Yokohama; Fuji Kiko Co., Ltd., Tokyo; Nissan Shatai Company, Limited, Hiratsuka, all of Japan

[21] Appl. No.: 859,029

[22] Filed: Mar. 27, 1992

[30] Foreign Application Priority Data

Mar. 29, 1991 [JP] Japan .................... 3-66111

[51] Int. Cl.⁵ .................................... B60K 41/26
[52] U.S. Cl. ............................ 74/878; 74/475; 70/245
[58] Field of Search ............... 70/245, 246, 247; 74/878, 475; 192/4 A

[56] References Cited

U.S. PATENT DOCUMENTS

| | | | |
|---|---|---|---|
| 4,473,141 | 9/1984 | Mochida | 192/1 |
| 4,474,085 | 10/1984 | DeVogelaere et al. | 74/878 |
| 4,880,092 | 11/1989 | Kito et al. | 74/878 X |
| 4,884,668 | 12/1989 | Kobayashi et al. | 192/4 A |
| 4,887,702 | 12/1989 | Ratke et al. | 192/4 A |
| 4,905,802 | 3/1990 | Gotoh | 70/247 X |
| 4,909,096 | 3/1990 | Kobayashi | 74/538 |
| 4,926,688 | 5/1990 | Muraski | 74/878 X |
| 4,932,493 | 6/1990 | Sakurai et al. | 180/271 |
| 4,967,883 | 11/1990 | Kito et al. | 74/878 X |
| 4,986,143 | 1/1991 | Livshits et al. | 74/878 X |
| 5,029,680 | 7/1991 | Kobayashi et al. | 192/4 A |
| 5,050,411 | 9/1991 | Kawachi et al. | 70/245 X |
| 5,129,494 | 7/1992 | Rolinski et al. | 74/878 X |

FOREIGN PATENT DOCUMENTS

| | | |
|---|---|---|
| 0315174 | 5/1989 | European Pat. Off. |
| 0334672 | 9/1989 | European Pat. Off. |
| 60-135352 | 7/1985 | Japan |
| 64-46824 | 3/1989 | Japan |
| 2-70531 | 3/1990 | Japan .................... 74/475 |
| 2-136329 | 5/1990 | Japan .................... 74/473 R |

Primary Examiner—Leslie A. Braun
Assistant Examiner—Ryan W. Massey
Attorney, Agent, or Firm—Foley & Lardner

[57] ABSTRACT

A mechanism is provided for controlling vehicle ignition lock and transmission shift lock in an interlocked relation to each other. The mechanism comprises a lock member movable into a lock position for blocking up a passage to a Park position of a position plate. An operating member drives the lock member into the lock position in response to upward movement of a position pin in the Park position. A stopper of an ignition lock is movable between a lock position for preventing rotation of a key rotor into a lock position and an unlock position for allowing the same. A cable interconnects the lock member and the stopper to allow them to move in unison such that movement of the lock member into the lock position causes the stopper to move into the unlock position and movement of the stopper into the lock position causes the lock member to move into the unlock position. A spring is installed in the ignition lock for urging the stopper toward the lock position.

9 Claims, 8 Drawing Sheets

VEHICLE IGNITION LOCK AND TRANSMISSION SHIFT LOCK CONTROL MECHANISM

BACKGROUND OF THE INVENTION

1. Field of the Invention

The present invention relates in general to vehicle ignition lock and transmission shift lock and more particularly to a mechanism for controlling such locks in an interlocked relation to each other.

2. Description of the Prior Art

A mechanism for controlling transmission shift lock in relation to vehicle ignition lock is disclosed in Japanese Utility Model Provisional Publication No. 64-46824 or Japanese Patent Provisional Publication No. 60-135352. In such prior art mechanisms, a control cable or cable mechanism is utilized to interconnect the vehicle ignition lock mechanism and the transmission shift lock mechanism.

In either of the prior art mechanisms, the control cable or cable mechanism is subjected to tension when the shift lever is operated for shifting from the Park position under a condition in which the vehicle ignition lock mechanism is locked or when the ignition key is operated for rotation into the lock position under a condition in which the transmission shift lock mechanism is locked.

SUMMARY OF THE INVENTION

In accordance with the present invention, there is provided a vehicle ignition lock and transmission shift lock control mechanism which comprise a shift lever movable into a plurality of gear positions including a Park position, and shift lock means connected to the shift lever for preventing shifting of the shift lever from the Park position.

The shift lock means has a position plate formed with a detent cam defining the gear positions, a position pin movably installed on the shift lever and engageable with the detent cam for positioning the shift lever in one of the gear positions, and a lock member for movement between a lock position for preventing shifting of the position pin from the Park position and an unlock position for permitting the same.

The mechanism further comprises ignition lock means for locking vehicle ignition. The ignition lock means has a key rotor rotatable into a lock position for locking vehicle ignition, and a stopper movable between a lock position for preventing rotation of the key rotor into the lock position and an unlock position for allowing the same.

The mechanism further comprises an operating member pivotally installed on the position plate and having a first arm movable in unison with the position pin when the position pin moves upward and downward in the Park position and a second arm connected to the lock member for driving the same into the lock position when the position pin moves upward in the Park position, cable means interconnecting the stopper and the operating member for allowing them to move in unison such that movement of the lock member into the lock position causes the stopper to move into the unlock position and movement of the stopper into the lock position causes the lock member to move into the unlock position, and biasing means for urging the stopper into the lock position.

The above structure is effective for attaining an assured and reliable operation of the mechanism over an elongated period of usage.

It is accordingly an object of the present invention to provide a vehicle ignition lock and transmission shift lock control mechanism which can effect an assured and reliable operation over an elongated period of usage.

It is a further object of the present invention to provide an ignition lock and shift lock control mechanism which is desirable from a safety drive point of view.

DETAILED DESCRIPTION OF THE PREFERRED EMBODIMENTS

Figure 1:
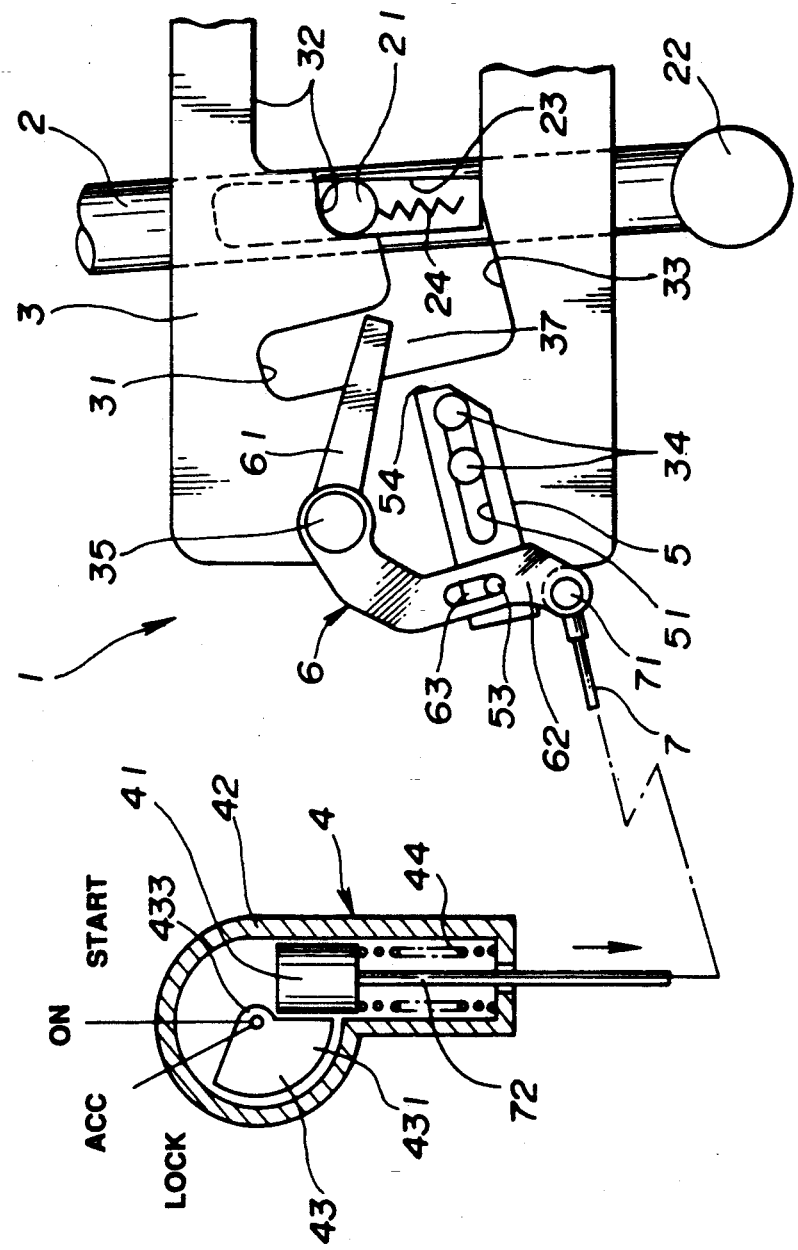
FIG. 1 is an elevational view partly in section depicting a vehicle ignition lock and transmission shift lock control mechanism according to an embodiment of the present invention.
Figure 2:
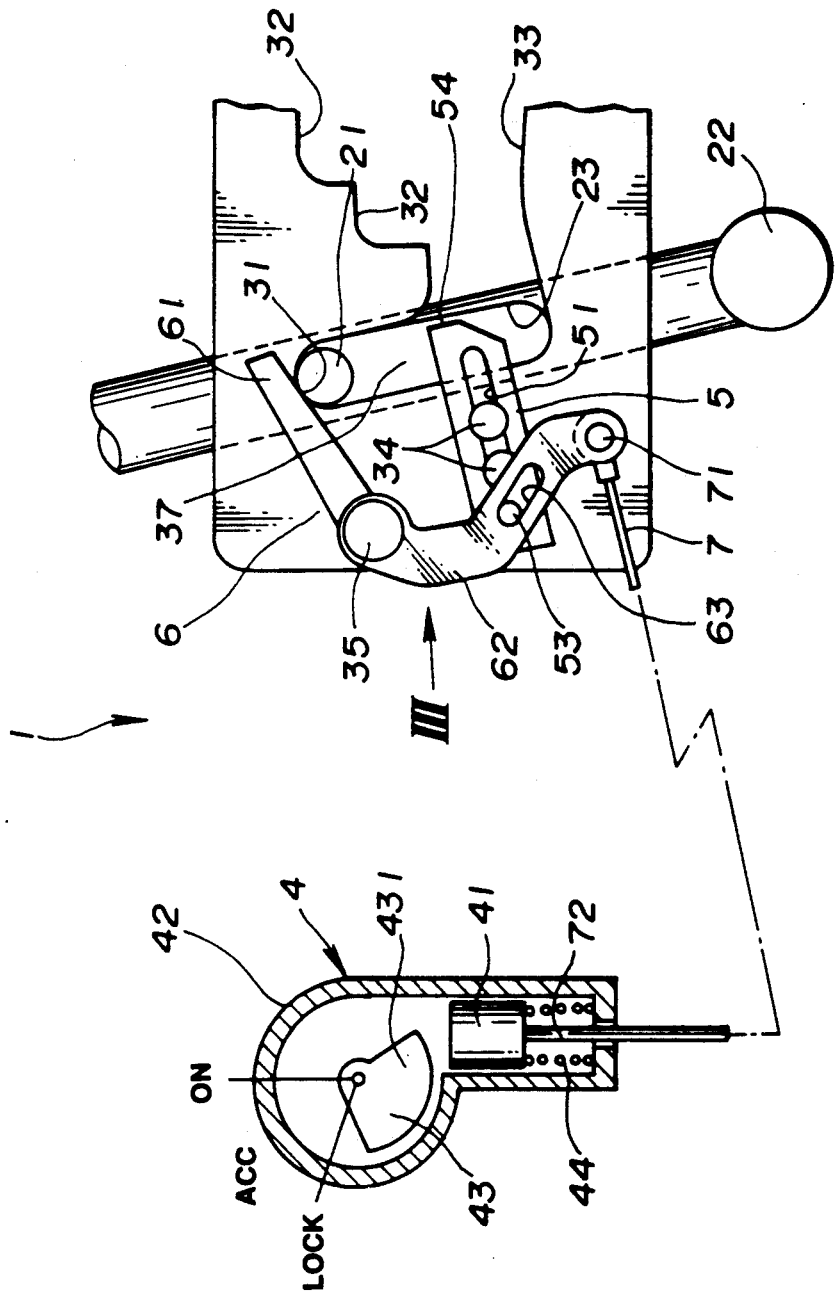
FIG. 2 is a view similar to FIG. 1 showing another operating position of the mechanism.
Figure 3:
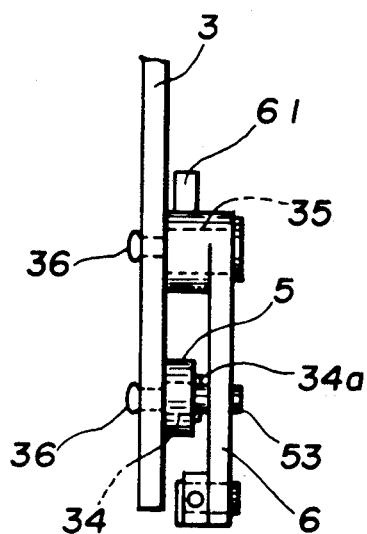
FIG. 3 is a view taken along the arrow "III" of FIG. 2.

Referring first to FIGS. 1 through 3, a vehicle ignition lock and transmission shift lock control mechanism according to an embodiment of the present invention is generally designated by the reference numeral 1 and shown as comprising a shift lever 2, position plate 3, cylinder lock or ignition lock 4, lock member 5 and operating member 6. The mechanism 1 is constructed so as to prevent rotation of a key rotor 43 of the ignition lock 4 into a lock position "LOCK" when a position pin 21 of the shift lever 2 is in one of gear positions other than a Park position, e.g. a Reverse position as shown in FIG. 1 and prevent shifting of the position pin 21 from a Park position when the key rotor 43 is in the lock position "LOCK". The lock member 5 is connected with the operating member 6 and is always biased by a first biasing means 44 in the direction to move away from a passage 37 to a detent cam slot 31 defining the Park position.

More specifically, the position plate 3 is in the form of a generally vertical plate and formed with a detent cam 33 including the detent cam slot 31 for defining the Park position and a plurality of detent cam surfaces 32 for defining gear positions other than the Park position, such as a Reverse position, Neutral position, Drive position, "2" position and "1" position. The detent cam 33 of the position plate 3 further includes the passage 37 to the detent cam slot 31.

The shift lever 2 is mounted on a vehicle body (not shown) for rotation or pivotal movement about a horizontal shaft 22 and on a plane parallel to the position plate 3, and shiftable into the Park position and other gear positions such as the Reverse position, Neutral position, Drive position, "2" position and "1" position.

The position pin 21 is installed on the shift lever 2 to extend transversely of the position plate 3 and for up-and-down movement within a slot 23. The position pin 21 is biased upward by a second biasing means 24 installed in the shift lever 2 for engagement with the detent cam slot 31 and detent cam surfaces 32. The position pin 21 can be moved downward against the bias of the second biasing means 24 for disengagement from the detent cam by the operation of a push button provided to the shift lever 2 though not shown in the drawing.

The shift lever 2, position pin 21, position plate 3, push button, etc. are preferably constructed in accordance with those shown in U.S. Pat. Nos. 4,884,668 and 5,029,680 assigned to the assignee of is application.

The lock member 5 is in the form of a horizontally elongated rectangular plate and formed with a horizontally elongated opening 51. The lock member 5 is slidably installed at the opening 51 on a pair of horizontal guide pins 34 and 34 which are in turn secured to the position plate 3 with screws 36. The lock member 5 is thus horizontally slidable relative to the position plate 3 and on a plane parallel thereto. The guide pins 34 and 34 have enlarged free ends 34a and 34a for preventing removal of the lock member 5 therefrom. The lock member 5 is movable into a lock position as shown in FIG. 2 for blocking up the passage 37 to the detent cam slot 31 and thereby preventing movement of the position pin 21 out of the detent cam slot 31, i.e., the Park position.

The operating member 6 has a C-like shape and is pivotally supported at an intermediate portion on a horizontal pivot pin 35 which is in turn attached to the position plate 3 with a screw 36. The operating member 6 is thus rotatable on a plane parallel to the position plate 3 and has first and second arms 61 and 62 separated by the pivot pin 35. The first arm 61 is movable between an upper position where it is located above the detent cam slot 31 as shown in FIG. 2 and a lower position where it extends across the passage 37 to the detent cam slot 31 as shown in FIG. 1. By this, when the position pin 21 is aligned with the detent cam slot 31, it is urged upward under the bias of the second biasing means 24 by prevailing the bias of the first biasing means 44, thus causing the first arm 61 of the operating member 6 to move from the lower position of FIG. 1 to the upper position of FIG. 2. The second arm 62 is formed with a vertically elongated opening 63 to receive therein a horizontal guide pin 53 secured to the lock member 5. By this, upward movement of the position pin 21 within the detent cam slot 31 causes the operating member 6 to swing counterclockwise in FIG. 1 while driving the lock member 5 rightward by way of the guide pin 53. The lock member 5 is thus caused to slide on the guide pins 34 and 34 and move into the position where its end portion 54 closes or blocks up the passage 37 to the detent cam slot 31 as shown in FIG. 2.

The second arm 62 of the operating member 6 is pivotally connected at a free end portion thereof to an end portion 71 of a cable 7, i.e., the end portion 71 of the cable 7 is swingable relative to the operating member 6 on a plane parallel to the position plate 3. The other end portion 72 of the cable 7 is connected to a stopper 41 installed in the ignition lock 4.

The ignition lock 4 includes a key cylinder or lock casing 42 in which the above described key rotor 43 is rotatably installed. An ignition key (not shown) is insertable into and removable from the key rotor 43 for controlling the position of the key rotor 43. The key rotor 43 is movable into the lock position "LOCK" for locking the steering and vehicle ignition, an accessories position "ACC" for enabling use of electric accessories when the engine is stopped, a normal operating position "ON" for turning on the ignition system and electrical circuits and a start position "START" for starting the engine.

The stopper 41 is installed in the lock casing 42 and connected to the second arm 62 of the operating member 6 by way of the cable 7. As shown in FIG. 1, the stopper 41 is movable into the lock position where it is positioned deeply inside the lock casing 42 under the bias of a coil spring 44 serving as the first biasing means and prevents rotation of the key rotor 43 into the lock position "LOCK". As shown in FIG. 2, the stopper 41 is also movable into the unlock position against the bias of the spring 44 when the lock member 5 is moved into the position for blocking up the passage 37 to the detent cam slot 31. In the unlock position, the stopper 41 is disabled to abut upon an abutment portion 431 of the key rotor 43 and permits rotation of the key rotor 43 into the lock position "LOCK".

When the key rotor 43 is in the lock position, the abutment portion 431 prevents movement of the stopper 41 into the lock position. The key rotor 43 has another abutment portion 433 for holding the stopper 41 in the lock position.

The coil spring 44 serving as the first biasing means is disposed within the ignition lock 4 and adapted for always urging the stopper 41, which is connected to the end portion 72 of the cable 7, toward the lock position. The biasing force of the coil spring 44 is smaller than that of the second biasing means 24 for urging the position pin 21 upward. The coil spring 44 is not necessarily disposed in the illustrated manner but may be wound around the pivot pin 35 or may be engaged at an end with the second arm 62 so as to urge the operating member 6 in the clockwise direction.

The vehicle ignition lock and transmission shift lock control mechanism 1 operates as follows.

(A) During parking in which transmission shift is locked:

During parking in which the shift lever 2 is in the Park position and the ignition key is removed from the ignition lock 4, the first arm 61 of the operating member 6 is held in the uppermost position as shown in FIG. 2, the lock member 5 is positioned so as to extend across the passage 37 to the detent cam slot 31 defining the Park position, and the stopper 41 is placed in the unlock position shown in FIG. 2.

If, under this condition, the push button of the shift lever 2 is operated to push the position pin 21 downward with a view to shifting the shift lever 2 from the Park position, the position pin 21 is caused to abut upon the upper side of the lock member 5 such that downward movement of the position pin 21 is restrained by the lock member 5 and therefore shifting from the Park position cannot be accomplished.

In this instance, it is to be noted that an operating force applied to the position pin 21 by way of the push button and compression rod acts on only the lock member 5 and is not supplied to the cable 7.

By this, the cable 7 or cable mechanism can effect a reliable and assured operation over an elongated period of usage.

(B) In the event of starting the vehicle:

To start the engine, the engine ignition key is inserted into the ignition lock 4 and turned to rotate the key rotor 43 toward the normal operating position "ON". By this, the abutment portion 431 is moved away from the passage through which the stopper 41 passes when moving from the unlock position to the lock position, thus allowing the stopper 41 to be movable into the lock position. The stopper 41 is thus moved upward into the lock position as shown in FIG. 1, pulling the end portion 72 of the cable 7 and thereby causing the second arm 62 of the operating member 6 to move from the position shown in FIG. 2 to the position shown in FIG. 1. By this, the one end portion 54 of the lock member 5 is moved away from the passage 37 to the detent cam slot 31, thus unlocking the transmission, i.e., releasing the transmission from Park/Lock.

Accordingly, the position pin 21 moves downward in unison with the first arm 61 of the operating member 6, while causing the lock member 5 to move increasingly away from the passage 37 to the detent cam slot 31 such that shifting of the position pin 21 from the Park position can be attained without being restrained by any obstacle.

(C) During vehicle running:

During vehicle running with the shift lever 2 being engaged in one of the gear positions other than the Park position, the operating member 6 is put into the position shown in FIG. 1, allowing the stopper 41 to be put into the lock position under the bias of the spring 44.

Accordingly, when an effort is made to turn the ignition key with a view to rotating the key rotor 43 into the lock position "LOCK", the abutment portion 431 of the key rotor 43 abuts upon the stopper 41 such that rotation of the key rotor 43 into the lock position "LOCK" beyond the accessories position "ACC" cannot be accomplished.

Accordingly, while the engine can be stopped, the ignition key cannot be removed from the ignition lock 4 since the ignition key cannot be rotated toward the lock position "LOCK".

Further, in the event of so turning the ignition key, the operating force acting on the key rotor 43 is not supplied to the cable 7 but sustained by the stopper 41. Accordingly, the cable 7 or cable mechanism can effect a reliable and assured operation over an elongated period of usage.

To remove the ignition key from the ignition lock 4, the shift lever 2 is first shifted to the Park position. By this, the position pin 21 is engaged with the lower side of the first arm 61 of the operating member 6 and moves upward in unison therewith under the bias of the second biasing means 24 by prevailing the bias of the first biasing means 44. Upward movement of the position pin 21 within the detent cam slot 31 causes the operating member 6 to rotate counterclockwise and causes the first arm 61 to move into its uppermost position shown in FIG. 2. As the operating member 6 is driven as above, the stopper 41 is pulled by the cable 7 and moved into the unlock position such that the key rotor 43 becomes rotatable into the lock position "LOCK". When the key rotor 43 is in the lock position, the ignition key is removable from the ignition lock 4.

In the foregoing, it will be understood that even when the position pin 21 is driven for downward movement under the condition in which the ignition key is removed from the i lock 4, or even when the ignition key is driven rotation into the lock position "LOCK" under the condition in which the shift lever 2 is engaged in one of the gear positions other than the Park position, no load or force is supplied to the cable 7 such that the cable 7 or cable mechanism can effect a reliable and assured operation over an elongated period of usage.

Figure 4:
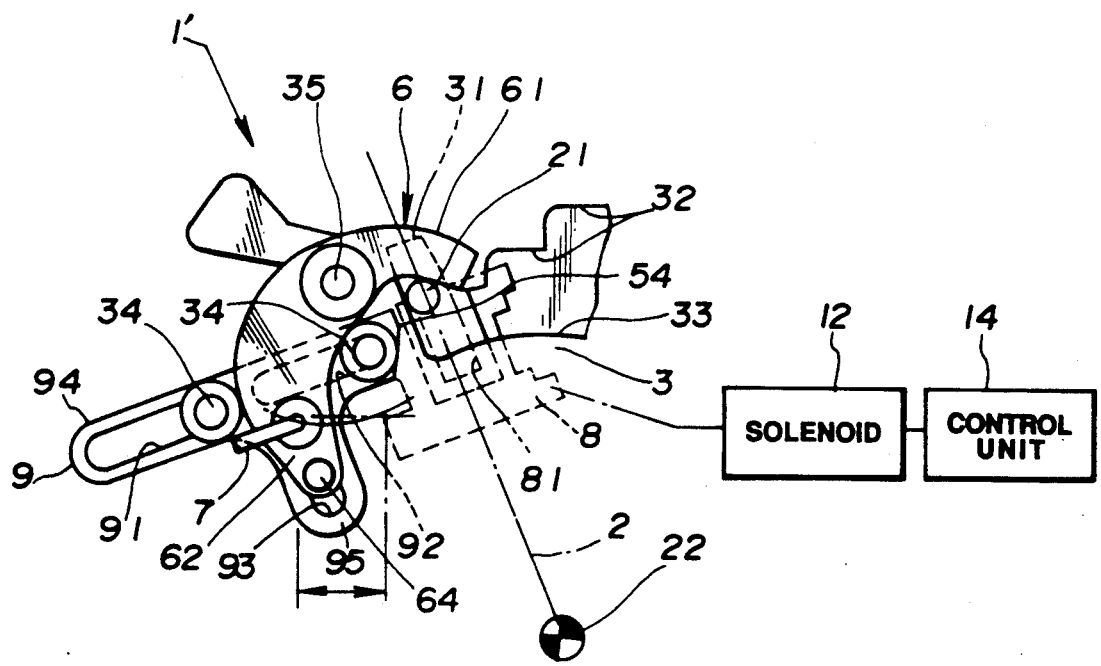
FIG. 4 is a fragmentary elevational view of a vehicle ignition lock and transmission shift lock control mechanism according to another embodiment of the present invention.
Figure 5:
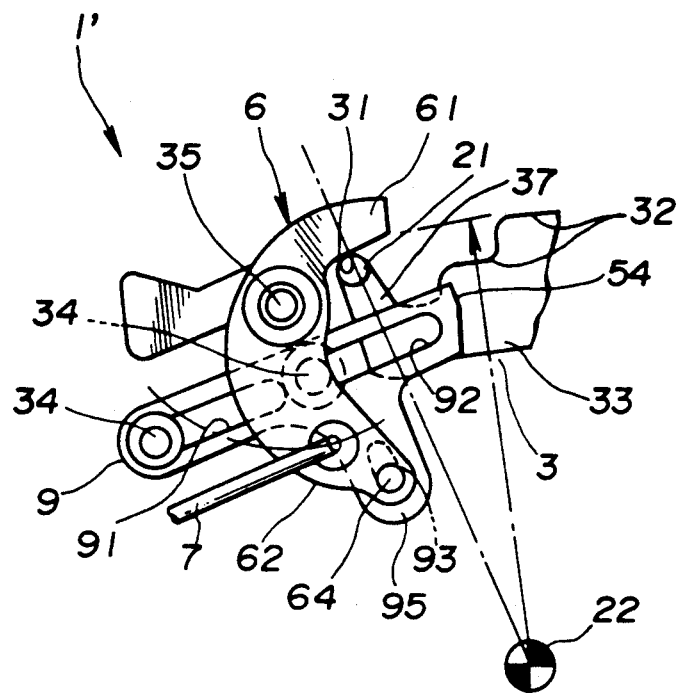
FIG. 5 is a view similar to FIG. 4 showing another operating position of the mechanism.

FIGS. 4 and 5 show a further embodiment of this invention. In this embodiment, a bushing 8 is rotatably installed on the shift lever 2. The bushing 8 includes a notch 81 for receiving therein the position pin 21 and thereby allowing downward movement of same when the bushing 8 is in the unlock position where the notch 81 is aligned with the position pin 21. When the bushing 8 is in the lock position where the notch 81 is misaligned with the position pin 21, downward movement of the position pin 21 is restrained by the bushing 8.

The bushing 8 is selectively rotated into the lock and unlock positions by means of a solenoid 12 and under control of a control unit 14.

The bushing 8, solenoid 12 and control unit 14 are preferably constructed in accordance with those shown in the above mentioned U.S. Pat. Nos. 4,884,668 and 5,029,680. That is, the bushing 8 has a peripheral projection or arm which is connected to a solenoid pin of the solenoid 12 serving as a third biasing means such that de-energization of the solenoid 12 causes the solenoid pin to project under the bias of a spring built-in the solenoid 12 for thereby causing the bushing 8 into the unlock position. When the solenoid 12 is energized, the solenoid pin retracts for thereby rotating the bushing 8 into the lock position. Energization and de-energization of the solenoid 12 is controlled by the control unit 14 in such a manner that when the ignition key is in the normal operating position "ON" and the shift lever 2 is in the Park position, the solenoid 12 is de-energized unless the brake pedal is fully depressed, thus holding the bushing 8 in the lock position for thereby preventing shifting of the shift lever 2 from the Park position. When the brake pedal is fully depressed, the solenoid 12 is energized, thus rotating the bushing 8 into the unlock position for thereby allowing shifting of the shift lever 2 from the Park position.

The lock member in this embodiment is generally designated by 9 and in the form of a T-like plate having a horizontal portion 94 and a vertical portion 95. The horizontal portion 94 is formed with two horizontally elongated openings 91 and 92 which are aligned in the longitudinal direction and receive therein the guide pins 34 and 34, respectively. The vertical portion 95 is formed with a vertically elongated opening 93 which receives therein a guide pin 64 secured to the second arm 62 of the operating member 6.

The mechanism 1' is put into the operating position shown in FIG. 4 when the shift lever 2 is in the Park position and the position pin 21 is about to move into the detent cam slot 31 under the bias of the second biasing means 24 shown in FIG. 1 or about to move out of the detent cam slot 31 by the operation of the push button provided to the shift lever 2 though not shown in the drawing.

When the position pin 21 is moved into its uppermost position shown in FIG. 5 under the bias of the second biasing means 24, counterclockwise rotation of the operating member 6 causes the lock member 9 to move into the lock position for blocking up the passage 37 to the detent cam slot 31 while causing the stopper 41 shown in FIG. 1 to move into the unlock position by way of the cable 7.

Accordingly, the mechanism 1' of this invention can operate similarly to the previous embodiment of FIGS. 1 to 3 and can produce substantially the same effect.

Figure 6:
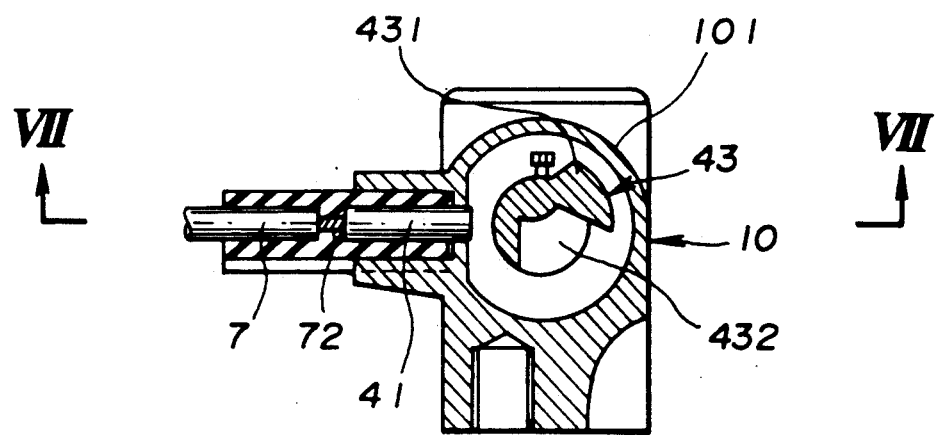
FIG. 6 is a sectional view of another embodiment of a cylinder lock for use in the mechanism of the present invention.
Figure 7:
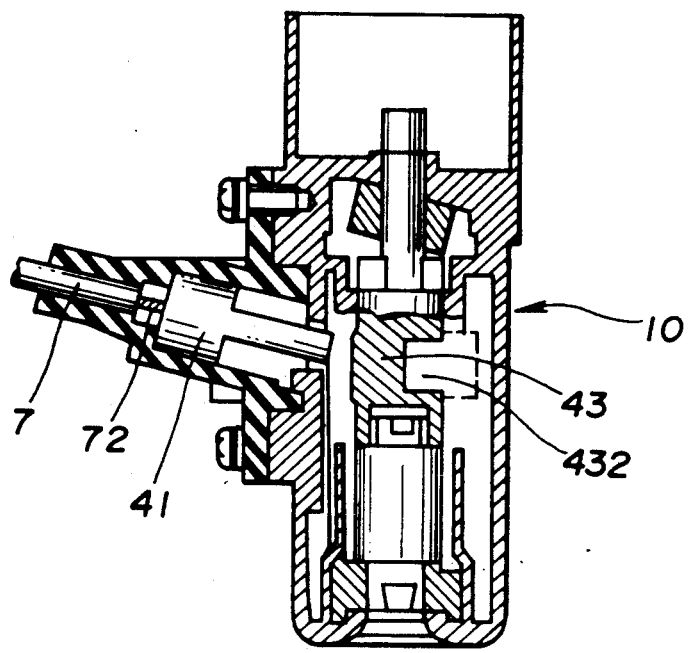
FIG. 7 is a sectional view taken along line VII—VII of FIG. 6.

The ignition lock 4 of the previous embodiment of FIGS. 1 to 3 may have such a specific structure as shown in FIGS. 6 through 10. Referring first to FIGS. 6 and 7, an ignition lock 10 includes a lock casing 101 and a key rotor 43 rotatably installed therein. The key rotor 43 has a abutment portion 431 and a recessed portion 432.

FIGS. 6 and 7 show an operating position of the ignition lock 10 into which it is put during such parking in which the shift lever 2 is in the Park position and the ignition key or key rotor 43 is in the lock position "LOCK". In this operating position, the ignition key can be rotated into the start position "START" to start the engine.

Figure 8:
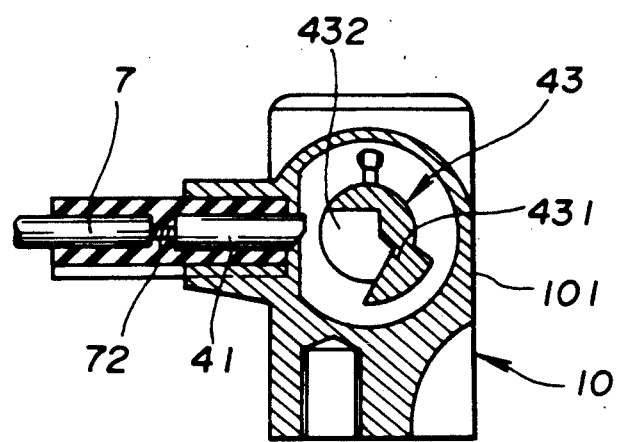
FIGS. 8 and 9 are views similar to FIG. 6 showing other operating positions of the cylinder lock.

FIG. 8 shows an operating position of the ignition lock 10 into which it is put during such parking in which the shift lever 2 is in the Park position and the ignition key inserted into the ignition lock 10 is in the accessories position "ACC". In this operating position, the stopper 41 connected to the end portion 72 of the cable 7 is movable into the recessed portion 432 of the key rotor 43, that is, the shift lever 2 is shiftable from the Park position to other gear positions.

Figure 9:
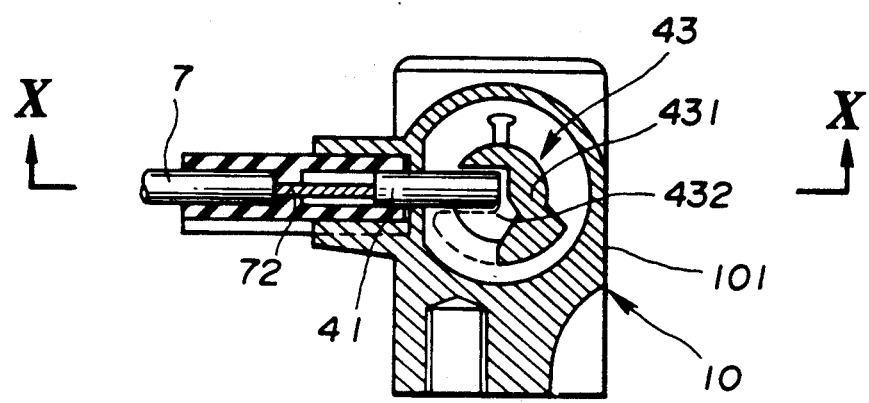
Figure 10:
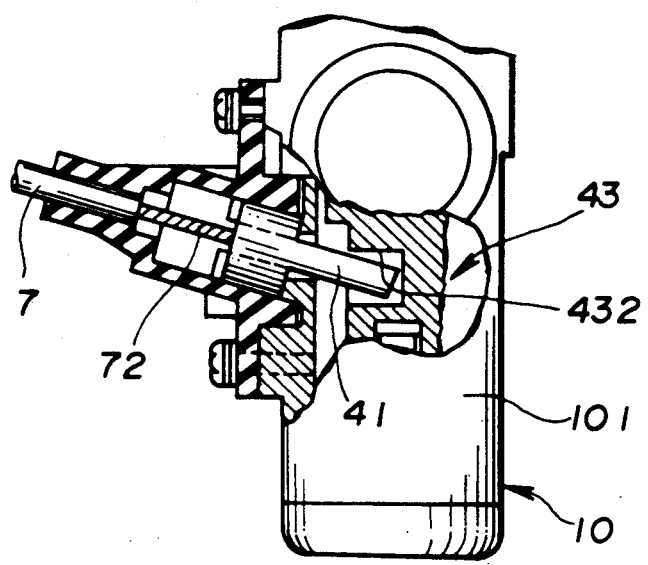
FIG. 10 is a sectional view taken along line X—X of FIG. 9.

FIGS. 9 and 10 show an operating position of the ignition lock 10 into which it is put when the shift lever 2 is one of gear positions other than the Park position and the ignition key inserted into the ignition lock 10 is in the accessories position "ACC". In this operating position, the stopper 41 connected to the end portion 72 of the cable 7 is moved into the recessed portion 432 of the key rotor 43 such that rotation of the key rotor 43 into the lock position "LOCK" is restrained by the stopper 41.

Figure 11:
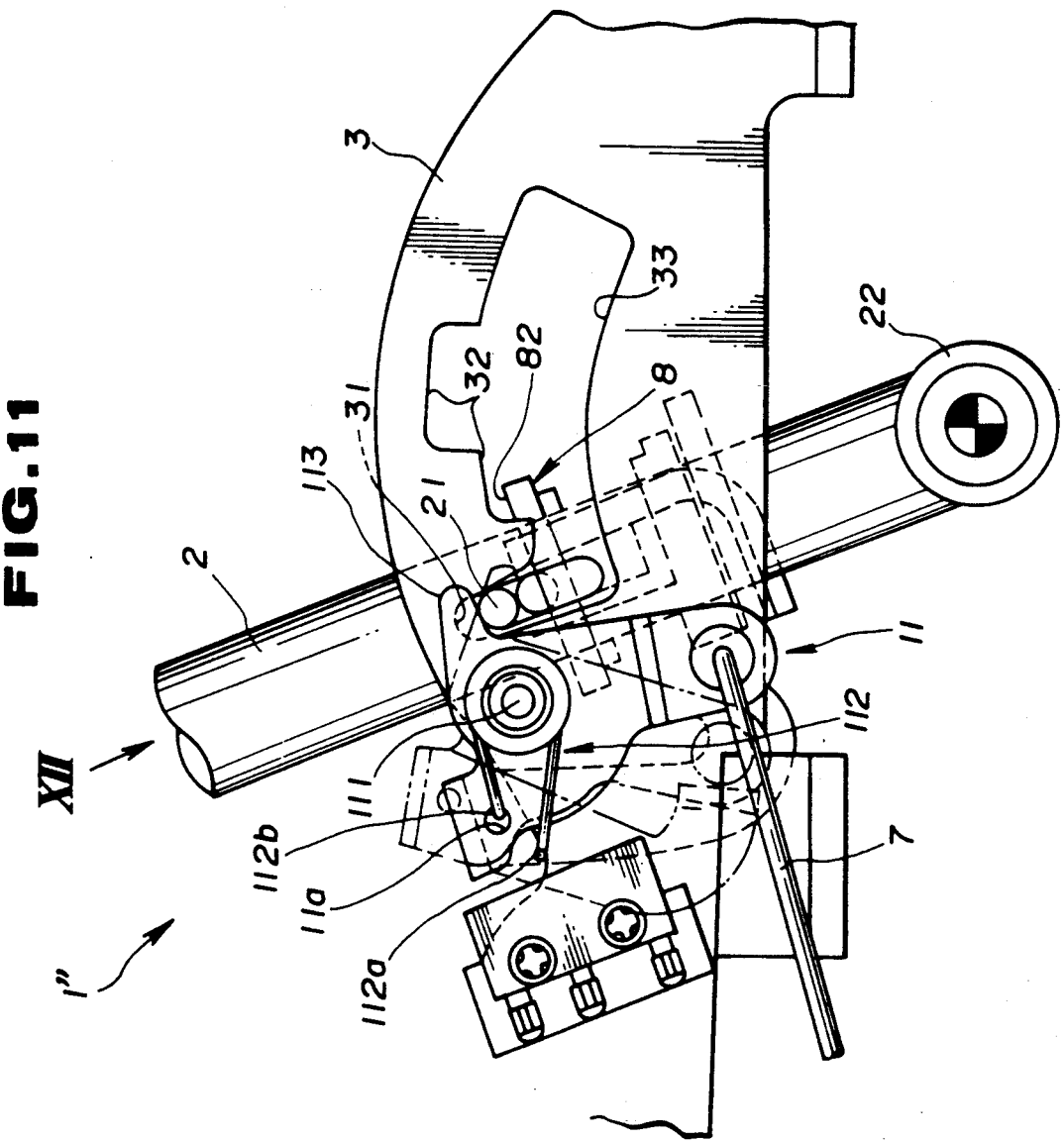
FIG. 11 is an elevational view of a vehicle ignition lock and transmission shift lock control mechanism according to a further embodiment of the present invention.
Figure 12:
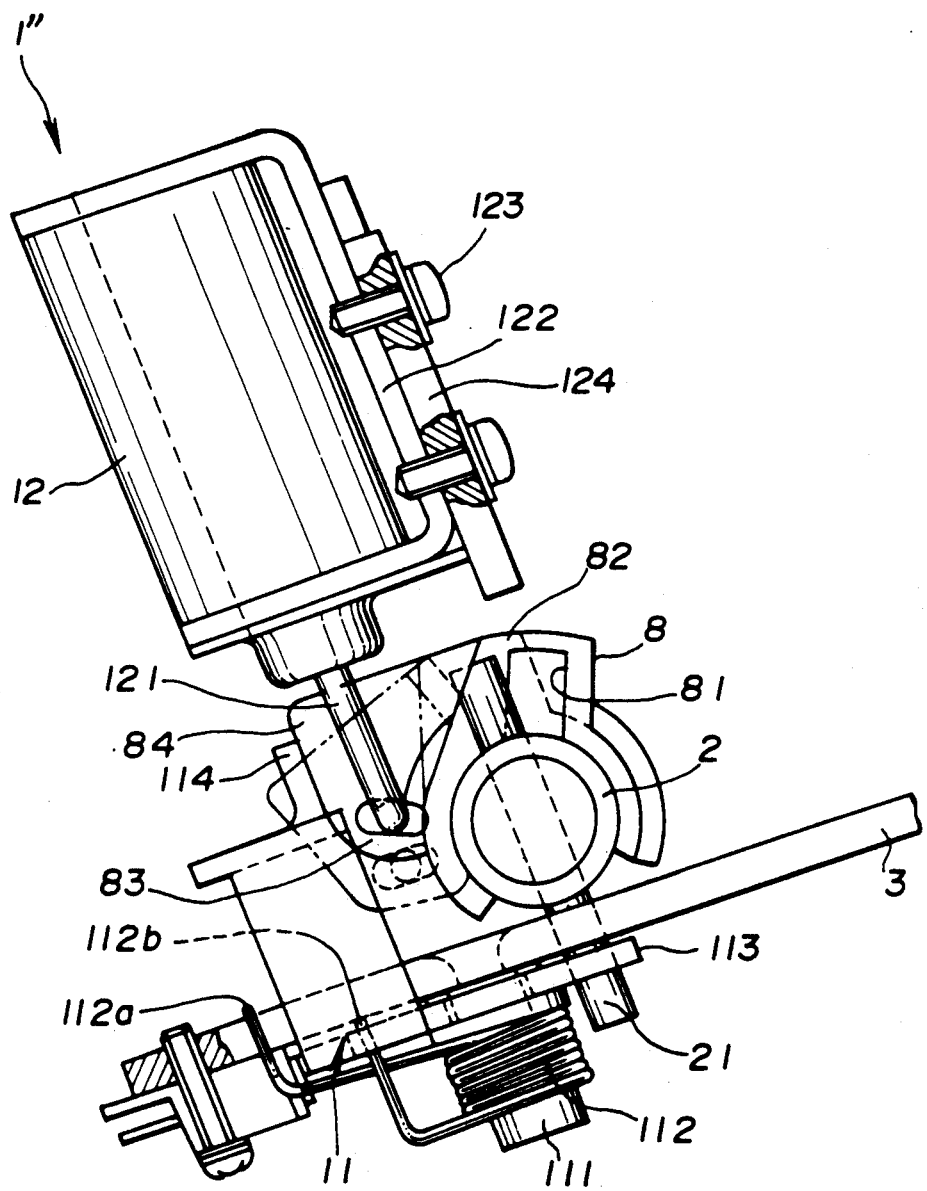
FIG. 12 is a view taken along the arrow "XII" of FIG. 11.

FIGS. 11 and 12 show a further embodiment of the present invention. In this embodiment, an operating member 11 cooperates with a rotatable bushing 8 which is adapted to serves as a lock member.

The operating member 11 is rotatably supported on the position plate 3 by means of a pin 111. A coil spring 112 serving as the first biasing means is wound around the pin 111 and engaged at an end 112a with the upper end portion of the position plate 3 and at the other end portion 112b in an opening 11a formed in the operating member 11 such that the operating member 11 is always urged for clockwise rotation in FIG. 11. The operating member 11 has a U-like shape and is arranged so as to straddle the position plate 3, that is, the operating member 11 has opposite side portions 113 and 114 disposed on the opposite sides of the position plate 3, respectively.

The bushing 8 is formed into a generally part-cylindrical shape and has a guide notch 81 for receiving therein the position pin 21. Such a bushing 8 may be constructed generally similarly to that shown in U.S. Pat. No. 4,909,096. When the bushing 8 is in the unlock position as shown by the two-dot chain lines in FIG. 12, the guide notch 81 is aligned with the position pin 21 to permit downward movement of same. When the bushing 8 is in the lock position as shown by the solid lines in FIG. 12, the guide notch 81 is misaligned with the position pin 21 to prevent downward movement of same. The solenoid 12 is supported on a bracket 122 which is in turn supported on the vehicle body (not shown) by way of a bracket 124.

The bushing 8 has an integral flange or arm 84 on the outer periphery thereof. The arm 84 is connected with the solenoid pin 121 of the solenoid 12.

When the shift lever 2 is in the Park position and the solenoid 12 is de-energized, the side portion 114 of the operating member 11 pushes the arm 84 and thereby causes the bushing 8 to move into the lock position shown by the solid lines in FIG. 12 by prevailing the bias of the spring built-in the solenoid 12. In this instance, downward movement of the position pin 21 is restrained by the upper end portion 82 of the bushing 8 such that movement of the position pin 21 out of the Park position cannot be accomplished. When the solenoid 12 is energized, the solenoid pin 121 is protruded, thus causing the bushing 8 to rotate into the unlock position shown by the two-dot chain lines in FIG. 12 by prevailing the bias of the second biasing means 112.

The energization and de-energization of the solenoid 12 is controlled similarly to the previous embodiment of FIGS. 4 and 5 and in the manner shown in the aforementioned U.S. patents.

What is claimed is:

1. A vehicle ignition lock and transmission shift lock control mechanism comprising:
   a shift lever movable into a plurality of gear positions including a Park position;
   shift lock means connected to said shift lever for preventing shifting of said shift lever from the Park position;
   said shift lock means having a position plate formed with a detent cam defining the gear positions, a position pin movably installed on said shift lever and engageable with the detent cam for positioning said shift lever in one of the gear positions, and a lock member for movement between a lock position for preventing shifting of said position pin from the Park position and an unlock position for permitting the same;
   ignition lock means for locking vehicle ignition;
   said ignition lock means having a key rotor rotatable into a lock position for locking vehicle ignition, and a stopper movable between a lock position for preventing rotation of said key rotor into the lock position and an unlock position for allowing the same;
   an operating member pivotally installed on said position plate and having a first arm movable in unison with said position pin when said position pin moves upward and downward in the Park position and a second arm connected to said lock member for driving the same into the lock position when said position pin moves upward in the Park position;
   cable means interconnecting said stopper and said operating member for allowing them to move in unison such that movement of said lock member into the lock position causes said stopper to move into the unlock position and movement of said stopper into the lock position causes said lock member to move into the unlock position; and
   biasing means for urging said stopper into the lock position.

2. The mechanism according to claim 1, wherein said detent cam of said position plate includes a detent cam slot defining the Park position and a passage to said detent cam slot, and said lock member is slidably installed on said position plate for blocking up said passage when in the lock position.

3. The mechanism according to claim 2, further comprising second biasing means installed on said shift lever for urging said position pin upward, a biasing force of said second biasing means being larger than that of said first mentioned biasing means.

4. The mechanism according to claim 3, wherein said lock member is in the form of a rectangular plate having a horizontally elongated opening which receives a pair of horizontal guide pins which are in turn secured to said position pin, said second arm of said operating member having a vertically elongated opening which receives therein a horizontal guide pin which is in turn secured to said lock member.

5. The mechanism according to claim 4, wherein said ignition lock includes a lock casing in which said stopper is installed for reciprocation between the lock position and the unlock position.

6. The mechanism according to claim 5, wherein said key rotor is installed in said lock casing and has an abutment portion for abutment upon said stopper when said key rotor is operated for rotation into the lock position under a condition in which said position pin is in one of the gear positions other than the Park position, said abutment portion of said key rotor being operable to prevent movement of said stopper into the lock position when said key rotor is in the lock position.

7. The mechanism according to claim 6, wherein said key rotor has another abutment portion for holding said stopper in the lock position under the bias of said first mentioned biasing means.

8. The mechanism according to claim 3, wherein said lock member has a T-like shape and has a horizontal portion and a vertical portion, said horizontal portion being formed with a horizontally elongated opening which receives therein a pair of horizontal guide pins which are in turn secured to said position plate, said vertical portion being formed with a vertical opening which receives therein a horizontal guide pin which is in turn secured to said second arm of said operating member.

9. The mechanism according to claim 1, wherein said lock member is in the form of a bushing rotatably installed on said shift lever and having a notch which is misaligned with said position pin when said lock member is in the lock position and aligned with said position pin when said lock member is i the unlock position.

* * * * *